United States Patent
Lee et al.

(10) Patent No.: US 11,577,497 B2
(45) Date of Patent: Feb. 14, 2023

(54) METHOD FOR PREPARING THERMOPLASTIC POLYURETHANE FILM AND THERMOPLASTIC POLYURETHANE FILM PREPARED THEREBY

(71) Applicant: LG Chem, Ltd., Seoul (KR)

(72) Inventors: Sang Yool Lee, Daejeon (KR); Joo Hee Hong, Daejeon (KR); Se Jung Park, Daejeon (KR); Sang Hwan Kim, Daejeon (KR); Jang Soon Kim, Daejeon (KR)

(73) Assignee: LG Chem, Ltd.

( * ) Notice: Subject to any disclaimer, the term of this patent is extended or adjusted under 35 U.S.C. 154(b) by 445 days.

(21) Appl. No.: 16/495,216

(22) PCT Filed: Mar. 20, 2018

(86) PCT No.: PCT/KR2018/003187
§ 371 (c)(1),
(2) Date: Sep. 18, 2019

(87) PCT Pub. No.: WO2018/174498
PCT Pub. Date: Sep. 27, 2018

(65) Prior Publication Data
US 2020/0009842 A1    Jan. 9, 2020

(30) Foreign Application Priority Data

Mar. 20, 2017    (KR) .................. 10-2017-0034801

(51) Int. Cl.
*B32B 27/40*    (2006.01)
*C08G 18/44*    (2006.01)
(Continued)

(52) U.S. Cl.
CPC .............. *B32B 27/40* (2013.01); *B29D 7/01* (2013.01); *B32B 27/08* (2013.01); *B32B 37/02* (2013.01);
(Continued)

(58) Field of Classification Search
CPC ......... B32B 27/40; B32B 27/08; B32B 37/02; C08G 18/44; C08G 18/3206;
(Continued)

(56) References Cited

U.S. PATENT DOCUMENTS

2009/0324941 A1    12/2009  Benoit et al.
2010/0032082 A1    2/2010   Ho et al.
(Continued)

FOREIGN PATENT DOCUMENTS

CN    104718243 A    6/2015
CN    105637000 A    6/2016
(Continued)

OTHER PUBLICATIONS

Machine_English_translation_JP_10008383_A; Jan. 1998, EPO, whole document (Year: 1998).*

(Continued)

*Primary Examiner* — Tahseen Khan
(74) *Attorney, Agent, or Firm* — Lerner, David, Littenberg, Krumholz & Mentlik, LLP

(57) ABSTRACT

A method for preparing a thermoplastic polyurethane film having a large thickness and excellent durability, and a thermoplastic polyurethane film prepared thereby are provided.

9 Claims, 2 Drawing Sheets

(51) Int. Cl.
  *C08G 18/32* (2006.01)
  *C08G 18/75* (2006.01)
  *C08G 18/24* (2006.01)
  *B32B 27/08* (2006.01)
  *B32B 37/02* (2006.01)
  *C08G 18/65* (2006.01)
  *C08G 18/73* (2006.01)
  *B29D 7/01* (2006.01)
  *C08J 5/12* (2006.01)
  *B32B 37/06* (2006.01)
  *B32B 37/20* (2006.01)
  *B29C 65/02* (2006.01)
  *B32B 38/00* (2006.01)

(52) U.S. Cl.
  CPC ............ *B32B 37/06* (2013.01); *B32B 37/203* (2013.01); *C08G 18/242* (2013.01); *C08G 18/3206* (2013.01); *C08G 18/44* (2013.01); *C08G 18/6511* (2013.01); *C08G 18/73* (2013.01); *C08G 18/755* (2013.01); *C08J 5/121* (2013.01); *B29C 65/02* (2013.01); *B32B 2038/0076* (2013.01); *B32B 2250/02* (2013.01); *B32B 2250/24* (2013.01); *B32B 2305/72* (2013.01); *B32B 2309/02* (2013.01); *B32B 2309/025* (2013.01); *B32B 2309/105* (2013.01); *B32B 2375/00* (2013.01)

(58) Field of Classification Search
  CPC ................ C08G 18/755; C08G 18/242; C08G 18/6511; C08G 18/73
  USPC ........................................................ 428/220
  See application file for complete search history.

(56) References Cited

U.S. PATENT DOCUMENTS

| | | | |
|---|---|---|---|
| 2010/0041295 A1 | 2/2010 | Malz et al. | |
| 2012/0160402 A1* | 6/2012 | Ho | B32B 37/24 156/222 |
| 2015/0232611 A1 | 8/2015 | Manabe et al. | |
| 2016/0257775 A1 | 9/2016 | Koike et al. | |
| 2018/0362785 A1* | 12/2018 | Arai | B32B 27/32 |

FOREIGN PATENT DOCUMENTS

| | | | | |
|---|---|---|---|---|
| EP | 2081769 | A2 | 7/2009 | |
| EP | 2230068 | A2 | 9/2010 | |
| EP | 2081769 | B1 * | 8/2016 | ............... C09J 7/29 |
| JP | S6049941 | A | 3/1985 | |
| JP | 10008383 | A * | 1/1998 | |
| JP | H10130615 | A | 5/1998 | |
| JP | 2001253033 | A | 9/2001 | |
| JP | 2004230749 | A | 8/2004 | |
| KR | 20080047454 | A | 5/2008 | |
| KR | 20080113886 | A | 12/2008 | |
| KR | 20090064560 | A | 6/2009 | |
| KR | 20110061085 | A | 6/2011 | |
| KR | 20120133671 | A | 12/2012 | |
| KR | 101307292 | B1 | 9/2013 | |

OTHER PUBLICATIONS

Chinese Search Report for Application No. 201880018745.7 dated Jul. 9, 2021, 3 Pages.
Search report from International Application No. PCT/KR2018/003187, dated Jun. 22, 2018.
Extended European Search Report including Written Opinion for EP18770652.8 dated Feb. 5, 2020; 9 pages.

* cited by examiner

[Figure 1]
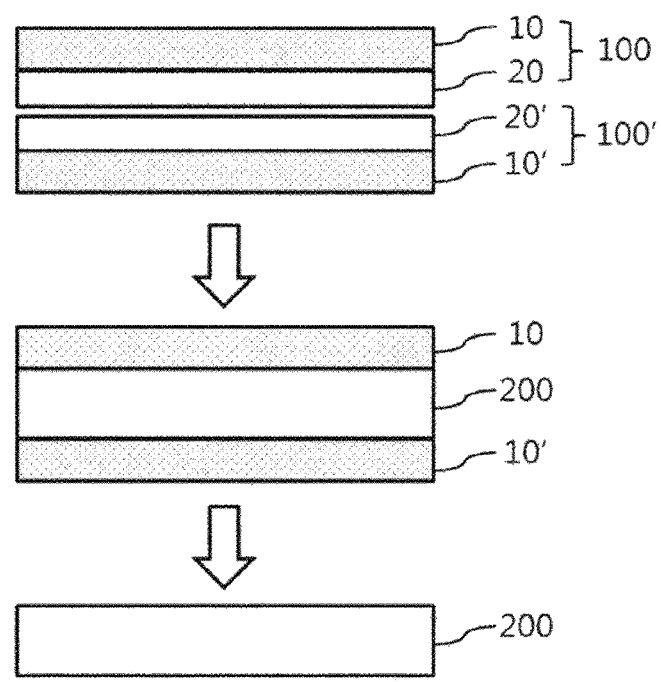

[Figure 2]
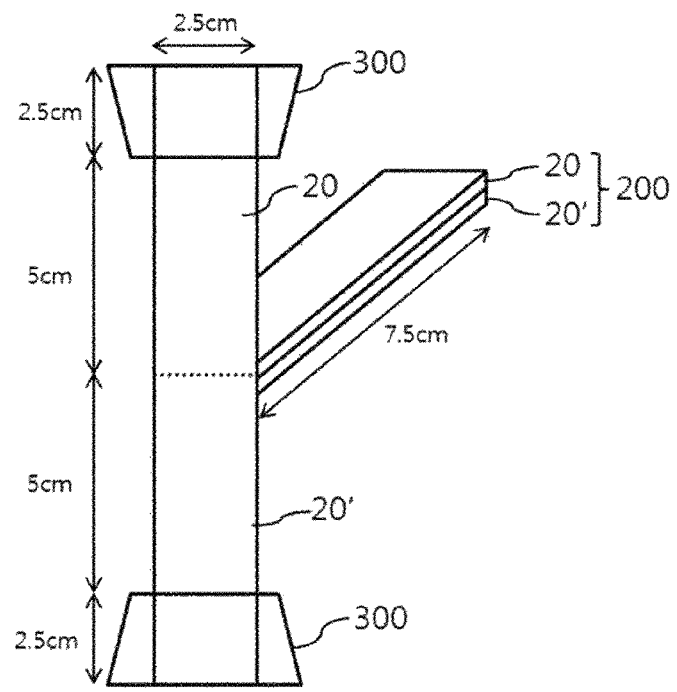

METHOD FOR PREPARING THERMOPLASTIC POLYURETHANE FILM AND THERMOPLASTIC POLYURETHANE FILM PREPARED THEREBY

The present specification claims priority to and the benefit of Korean Patent Application No. 10-2017-0034801 filed in the Korean Intellectual Property Office on Mar. 20, 2017, the entire contents of which are incorporated herein by reference.

CROSS-REFERENCE TO RELATED APPLICATIONS

The present application is a national phase entry under 35 U.S.C. § 371 of International Application No. PCT/KR2018/003187 filed Mar. 20, 2018, which claims priority from Korean Patent Application No. 10-2017-0034801 filed in the Korean Intellectual Property Office on Mar. 20, 2017, the entire contents of which are incorporated herein by reference.

TECHNICAL FIELD

The present invention relates to a thermoplastic polyurethane film having a large thickness and a preparation method thereof.

BACKGROUND ART

A thermoplastic polyurethane (TPU) film is excellent in mechanical properties such as strength, stretch characteristics, toughness, and abrasion resistance, and thus has been mainly used in the automobile field.

In general, a polyurethane solution is prepared by dissolving an extruded and molded polyurethane pellet in a solvent, and a thermoplastic polyurethane film is prepared by applying the polyurethane solution onto a substrate. However, since a polyurethane pellet having a high molecular weight is not dissolved well in a solvent, a content of a solid content of a polyurethane solution prepared is about 15% or less, which is a low value. Since a polyurethane solution having a low content of the solid content may not be applied onto a substrate to have a predetermined thickness or more, there is a problem in that it is difficult to prepare a thick polyurethane film. Further, since it is difficult to carry out an additional polymerization reaction on a polyurethane pellet, there is a problem in that it is not easy to control physical properties of a thermoplastic polyurethane film prepared from a polyurethane solution, and there is a problem in that it is necessary to use a highly toxic solvent in order to dissolve a polyurethane pellet having a high molecular weight.

Further, a thermoplastic polyurethane film having excellent durability and service life characteristics is required in the automobile field.

Thus, there is a need for a technology capable of preparing a thermoplastic polyurethane film having a large thickness and excellent durability by using a low toxic solvent while using a polyurethane resin having a high molecular weight.

DETAILED DESCRIPTION OF THE INVENTION

Technical Problem

The present invention has been made in an effort to provide a thermoplastic polyurethane film having a large thickness and excellent durability, and a preparation method thereof.

However, a technical problem to be solved by the present invention is not limited to the aforementioned problem, and the other problems that are not mentioned may be clearly understood by a person skilled in the art from the following description.

Technical Solution

An exemplary embodiment of the present invention provides a method for preparing a thermoplastic polyurethane film, the method including: preparing a polyurethane resin composition including a polyurethane resin, a first isocyanate-based curing agent, and an organic solvent; preparing a laminate including a polyurethane resin layer by applying the polyurethane resin composition onto a substrate film and heat-treating the polyurethane resin composition; providing the two laminates to join them so that respective polyurethane resin layers of the laminates face each other; and forming a thermoplastic polyurethane film including the two polyurethane resin layers directly brought into contact with each other by aging the joined laminates, in which an interfacial bonding strength between the two polyurethane resin layers is 14 Mpa to 18 Mpa.

Another exemplary embodiment of the present invention provides a thermoplastic polyurethane film including two polyurethane resin layers directly brought into contact with each other, in which an interfacial bonding strength between the two polyurethane resin layers is 14 Mpa to 18 Mpa, and the polyurethane resin layer includes a cured product of a polyurethane resin composition including a polyurethane resin, a first isocyanate-based curing agent, and an organic solvent.

Advantageous Effects

The method for preparing a thermoplastic polyurethane film according to an exemplary embodiment of the present invention may easily prepare a thermoplastic polyurethane film having a large thickness and excellent durability.

The thermoplastic polyurethane film according to an exemplary embodiment of the present invention may have a large thickness and excellent durability.

The effects of the present invention are not limited to the above-described effects, and effects, which are not mentioned, will be clearly understood by a person skilled in the art from the specification of the present application and the accompanying drawings.

BRIEF DESCRIPTION OF DRAWINGS

FIG. 1 is a schematic view illustrating a method for preparing a thermoplastic polyurethane film according to an exemplary embodiment of the present invention.

FIG. 2 is a view schematically illustrating an experiment of measuring an interfacial bonding strength between the polyurethane resin layers according to an exemplary embodiment of the present invention.

BEST MODE

Throughout the specification of the present application, when one part "includes" one constituent element, unless otherwise specifically described, this does not mean that another constituent element is excluded, but means that another constituent element may be further included.

Throughout the specification of the present application, when one member is disposed "on" another member, this includes not only a case where the one member is brought into contact with another member, but also a case where still another member is present between the two members.

Throughout the specification of the present application, the unit "wt %" may mean a weight ratio of a component included in a member based on the total weight of the member.

Throughout the specification of the present application, the unit "part by weight" may mean a weight ratio between the respective components.

Throughout the specification of the present application, the term "polymerization unit" may mean a form in which monomers react in a polymer, and specifically, may mean a form in which the polymer is subjected to a polymerization reaction to form a skeleton of the polymer, for example, a main chain or a side chain.

Throughout the specification of the present application, "a weight average molecular weight" and "a number average molecular weight" of a compound may be calculated by using a molecular weight and a molecular weight distribution of the compound. Specifically, a sample specimen in which a concentration of a compound is 1 wt % is prepared by putting tetrahydrofuran (THF) and the compound into a 1-ml glass bottle, a standard specimen (polystyrene) and the sample specimen are filtered through a filter (pore size of 0.45 mm), and then the elution time of the sample specimen is compared with the calibration curve of the standard specimen by injecting the specimens into a GPC injector, thereby obtaining the molecular weight and the molecular weight distribution of the compound. In this case, Infinity II 1260 (manufactured by Agilent Inc.) may be used as a measuring apparatus, and the flow rate and the column temperature may be set to 1.00 mL/min and 40.0° C., respectively.

Hereinafter, the present specification will be described in more detail.

An exemplary embodiment of the present invention provides a method for preparing a thermoplastic polyurethane film, the method including: preparing a polyurethane resin composition including a polyurethane resin, a first isocyanate-based curing agent, and an organic solvent; preparing a laminate including a polyurethane resin layer by applying the polyurethane resin composition onto a substrate film and heat-treating the polyurethane resin composition; providing the two laminates to join them so that respective polyurethane resin layers of the laminates face each other; and forming a thermoplastic polyurethane film including the two polyurethane resin layers directly brought into contact with each other by aging the joined laminates, in which an interfacial bonding strength between the two polyurethane resin layers is 14 Mpa to 18 Mpa.

The method for preparing a thermoplastic polyurethane film according to an exemplary embodiment of the present invention may easily prepare a thermoplastic polyurethane film having a large thickness and excellent durability. Specifically, a thermoplastic polyurethane film having a larger thickness and improved durability may be prepared by providing two polyurethane resin layers to be directly brought into contact with each other. Further, an interfacial bonding strength between the two polyurethane resin layers which are directly brought into contact with each other is 14 Mpa to 18 Mpa, and the two polyurethane resin layers may be effectively suppressed from being peeled off from each other. A thermoplastic polyurethane film including the two polyurethane resin layers having an excellent interfacial bonding strength may have excellent durability and service life characteristics.

According to an exemplary embodiment of the present invention, a content of the first isocyanate-based curing agent may be more than 5 parts by weight and less than 7.5 parts by weight, or 5.5 parts by weight to 7.25 parts by weight, based on 100 parts by weight of the polyurethane resin. It is possible to improve the interfacial bonding strength between the two polyurethane resin layers and the durability of the thermoplastic polyurethane film by adjusting the content of the first isocyanate-based curing agent within the above-described range.

According to an exemplary embodiment of the present invention, the first isocyanate-based curing agent may include two to six isocyanate functional groups. For example, the first isocyanate-based curing agent may include at least one of H12MDI which is a bifunctional isocyanate-based curing agent manufactured by Evonik Industries, MHG-80B which is a hexafunctional isocyanate-based curing agent manufactured by Asahi Kasei Chemicals Corporation, MFA-100 which is a hexafunctional isocyanate-based curing agent manufactured by Asahi Kasei Chemicals Corporation, and TKA-100 which is a trifunctional isocyanate-based curing agent manufactured by Asahi Kasei Chemicals Corporation.

According to an exemplary embodiment of the present invention, the polyurethane resin may be prepared by carrying out a copolymerization reaction of a mixture, which includes: a polyol having a number average molecular weight of 1,800 g/mol to 2,200 g/mol; a chain extender including a diol having 4 to 10 carbon atoms; and a second isocyanate-based curing agent, in an organic solvent.

According to an exemplary embodiment of the present invention, the polyurethane resin may be a block copolymer including a soft segment and a hard segment. Specifically, the soft segment of the polyurethane resin may include a polymerization unit derived from the polyol and the second isocyanate-based curing agent, and the hard segment of the polyurethane resin may include a polymerization unit derived from the chain extender and the second isocyanate-based curing agent.

According to an exemplary embodiment of the present invention, the polyol may have a number average molecular weight of 1,800 g/mol to 2,200 g/mol, 1,950 g/mol to 2,050 g/mol, or 1,900 g/mol to 2,100 g/mol. When the number average molecular weight of the polyol is within the above-described range, it is possible to suppress the elongation of the thermoplastic polyurethane film from being decreased.

According to an exemplary embodiment of the present invention, the polyol may be a diol containing two hydroxyl groups. Specifically, the polyol may include one or more of polycarbonate diol, polycaprolactone diol, polyester diol, and polyether diol.

According to an exemplary embodiment of the present invention, a content of the polyol may be 45 wt % to 55 wt % based on the weight of the mixture. Specifically, the content of the polyol may be 48 wt % to 54 wt % or 50 wt % to 53 wt %, based on the weight of the mixture. By adjusting the content of the polyol in the mixture within the above-described range, the polymerization reaction of the polyurethane resin may be stably carried out, and the processability of the thermoplastic polyurethane film may be improved.

According to an exemplary embodiment of the present invention, the chain extender may include a diol having 4 to 10 carbon atoms, or a diol having 4 to 6 carbon atoms. A chain extender including the diol having carbon atoms within the above-described range may effectively extend the chains of the second isocyanate-based curing agent. Specifically, the chain extender may include at least one of 1,4-butanediol, 1,5-pentanediol, 1,6-hexanediol, neopentyl glycol, 1,10-decanediol, 1,1-cyclohexanedimethanol, and 1,4-cyclohexanedimethanol.

According to an exemplary embodiment of the present invention, a content of the chain extender may be 10 wt % to 15 wt %, specifically, 10.5 wt % to 14 wt %, or 12 wt % to 12.5 wt %, based on the weight of the mixture. By adjusting the content of the chain extender in the mixture within the above-described range, the weight average molecular weight of the polyurethane resin may be effectively improved. Further, when the content of the chain extender is within the above-described range, the chain extender may react with the second isocyanate-based curing agent to effectively form the hard segment of the polyurethane resin, and may improve mechanical properties of a prepared thermoplastic polyurethane film.

According to an exemplary embodiment of the present invention, the second isocyanate-based curing agent may include two to six isocyanate functional groups. Specifically, the second isocyanate-based curing agent may include two isocyanate functional groups. For example, the second isocyanate-based curing agent may include at least one of isophorone diisocyanate (IPDI), methylenediphenyl-4,4'-diisocyanate, 4,4'-methylenebiscyclohexyl diisocyanate, xylene diisocyanate (XDI), naphthalene-1,5-diisocyanate, and cyclohexane diisocyanate.

According to an exemplary embodiment of the present invention, a content of the second isocyanate-based curing agent may be 32.5 wt % to 40 wt % based on the weight of the mixture. Specifically, the content of the second isocyanate-based curing agent may be 34 wt % to 38 wt % or 35 wt % to 36.5 wt %, based on the weight of the mixture. By adjusting the content of the second isocyanate-based curing agent within the above-described range, the polyurethane resin may be effectively polymerized, and processability and durability of a prepared thermoplastic polyurethane film may be improved.

According to an exemplary embodiment of the present invention, the mixture may further include a catalyst, and a content of the catalyst may be 0.005 part by weight to 0.02 part by weight or 0.008 part by weight to 0.015 part by weight, based on 100 parts by weight of the mixture. By adjusting the content of the catalyst within the above-described range, a polymerization reaction of the polyurethane resin may be effectively promoted, and the polyurethane resin may be polymerized at a relatively low temperature. As the catalyst, a catalyst used in the art may be used without limitation, and for example, dibutyl tin dilaurate (DBTDL) may be used.

According to an exemplary embodiment of the present invention, the number of carbon atoms constituting a diol used as the chain extender is less than the number of carbon atoms constituting the polyol, so that the diol in the mixture has a higher fluidity than that of the polyol. Thereby, in the mixture, a reaction of the chain extender and the second isocyanate-based curing agent may occur earlier than a reaction of the polyol and the second isocyanate-based curing agent. Specifically, when butanediol is used as the chain extender, one hydroxyl group of two hydroxyl groups of the butanediol reacts with and is bonded to an isocyanate group of the second isocyanate-based curing agent, and while a process of bonding an unreacted hydroxyl group of the butanediol to a new isocyanate group of the second isocyanate-based curing agent is repeated, a second isocyanate-based curing agent having a long extended chain structure may be formed. Thereafter, a second isocyanate-based curing agent having a long extended chain structure may react with the polyol to form a polyurethane resin having an increased weight average molecular weight.

According to an exemplary embodiment of the present invention, the polyurethane resin may have a weight average molecular weight of 40,000 g/mol to 70,000 g/mol. By adjusting the number average molecular weight of the polyol, the number of carbon atoms of the diol used as the chain extender, the content of the polyol in the mixture, the content of the chain extender, the content of the second isocyanate-based curing agent, and the like, the weight average molecular weight of the polyurethane resin may be controlled. By adjusting the weight average molecular weight of the polyurethane resin, physical properties of the thermoplastic polyurethane film such as tensile strength and durability may be easily controlled.

According to an exemplary embodiment of the present specification, the copolymerization reaction may be carried out at a temperature of 50° C. to 70° C. By adjusting the polymerization reaction temperature within the above-described range, the polyurethane resin may be stably polymerized. Further, since the polyurethane resin may be polymerized at a relatively low temperature, the preparation cost and preparation time of the thermoplastic polyurethane film may be reduced.

According to an exemplary embodiment of the present invention, the polymerization reaction of the polyurethane resin may be carried out in an organic solvent. When an aqueous solvent is used in order to prepare a thermoplastic polyurethane film, urethane particles need to be processed in the form of beads having a diameter ranging from dozens of nanometers to hundreds of nanometers and dispersed on an aqueous solvent. In this case, since additives such as various surfactants and monomers need to be used in order to effectively disperse urethane particles on an aqueous solvent, there are problems in that a process of preparing the thermoplastic polyurethane film becomes complicated, and preparation time and preparation cost thereof are increased.

In contrast, according to an exemplary embodiment of the present invention, since the polyurethane resin is in a state of being dissolved in the organic solvent, a dispersion stabilizer-based additive such as an additional dispersant and a surfactant need not be added to the urethane composition. Accordingly, preparation time and preparation cost of the thermoplastic polyurethane film may be reduced.

According to an exemplary embodiment of the present invention, the organic solvent may include at least one of acetone, methyl ethyl ketone, methyl isobutyl ketone, cyclohexane, toluene, xylene, ethylene glycol monomethyl ether (methyl cellosolve), and ethylene glycol monoethyl ether (ethyl cellosolve). Since the above-described kind of organic solvent used during polymerization of the polyurethane resin has little toxicity, it is possible to prevent the human body of a user and the environment from being harmfully affected by using the organic solvent.

According to an exemplary embodiment of the present invention, a composition including a polyurethane resin and an organic solvent may be prepared by allowing the mixture to react in an organic solvent, and the polyurethane resin composition may be prepared by adding a first isocyanate-based curing agent to the composition. That is, the organic solvent of the polyurethane resin composition may be an organic solvent which is used during the preparation of the polyurethane resin and remains. Further, an additional organic solvent may be added to the polyurethane resin composition.

According to an exemplary embodiment of the present invention, a content of the organic solvent may be 30 parts by weight to 80 parts by weight based on 100 parts by weight of the polyurethane resin. By adjusting the content of the organic solvent within the above-described range, it is possible to suppress a phenomenon that the polyurethane resin composition is rapidly dried in a step of heat-treating the polyurethane resin composition, so that the organic solvent is swollen, and it is possible to prevent the thickness of the thermoplastic polyurethane film from being reduced.

According to an exemplary embodiment of the present invention, a content of a solid content of the polyurethane resin composition may be 20% to 70%, specifically, 30% to 60%, or 40% to 55%. In the present specification, the "solid content" may mean a solute or a solid material except for the solvent in the entire solution, and specifically, the solid content of the polyurethane resin composition may collectively refer to the polyurethane resin, the first isocyanate-based curing agent, and an additive such as the catalyst, except for the organic solvent. When the content of the solid content of the polyurethane resin composition is within the above-described range, the polyurethane resin composition may be applied thickly onto a substrate, and accordingly, a thermoplastic polyurethane film having a large thickness may be prepared.

FIG. 1 is a schematic view illustrating a method for preparing a thermoplastic polyurethane film according to an exemplary embodiment of the present invention. Referring to FIG. 1, two laminates 100 and 100' including polyurethane resin layers 20 and 20' and substrate films 10 and 10' may be prepared by heat-treating the polyurethane resin composition applied on the substrate films. The two polyurethane resin layers 20 and 20' may adhere to each other by disposing the two polyurethane resin layers 20 and 20' included in the laminates 100 and 100' to face each other and joining the two laminates 100 and 100'. Thereafter, a thermoplastic polyurethane film 200 may be prepared by aging the laminates. Thereafter, the two substrate films 10 and 10' may be additionally removed.

According to an exemplary embodiment of the present invention, the method of applying the polyurethane resin composition onto the substrate film is not particularly limited, and for example, it is possible to use any one method of spray coating, gravure coating, microgravure coating, roll coating, flexo coating, screen coating, spin coating, flow coating, knife coating, nozzle coating, rotary screen coating, reverse rod coating, comma coating, lip coating, and die coating.

According to an exemplary embodiment of the present invention, the polyurethane resin layer is formed on the substrate film by heat-treating the polyurethane resin composition applied on the substrate film, thereby preparing a laminate. Specifically, a polyurethane resin layer having a thickness of 10 μm to 250 μm may be formed on a substrate film by applying the polyurethane resin composition to have a thickness of 20 μm to 500 μm onto the substrate film and heat-treating the polyurethane resin composition. In the process of heat-treating the polyurethane resin composition applied on the substrate film, the thickness of the formed polyurethane resin layer may be reduced as the organic solvent included in the polyurethane resin composition is volatilized. Thus, the thickness of the polyurethane resin composition applied on the substrate film may be adjusted in consideration of the thickness of the polyurethane resin layer that is reduced as the organic solvent is volatilized.

According to an exemplary embodiment of the present invention, the polyurethane resin composition may be heat-treated at a temperature of 100° C. to 150° C. By adjusting the heat treating temperature condition within the above-described range, a polyurethane resin layer may be formed by effectively volatilizing an organic solvent included in the polyurethane resin composition. Further, by heat-treating the polyurethane resin composition within the above-described temperature range, it is possible to suppress a phenomenon that the polyurethane resin composition is rapidly dried, so that the organic solvent is swollen, and it is possible to suppress a yellowing phenomenon from occurring in the prepared polyurethane resin layer.

According to an exemplary embodiment of the present invention, the laminates may be joined at a temperature of 80° C. to 140° C. Specifically, two laminates provided by the aforementioned method are prepared, the two laminates are stacked such that the respective polyurethane resin layers face each other, and the polyurethane resin layers are heated within the above-described temperature range, thereby joining the two laminates. When the polyurethane resin layers are heated, and thus the temperatures of the polyurethane resin layers reach the glass transition temperature, a surface where the two polyurethane resin layers are brought into contact with each other is melted, and as a result, the viscosity may be increased. Accordingly, the two polyurethane resin layers adhere to each other, and the two adhered polyurethane resin layers may not be easily peeled off.

Accordingly, the method for preparing a thermoplastic polyurethane film according to an exemplary embodiment of the present invention may prepare a thermoplastic polyurethane film having a large thickness by adhering two polyurethane resin layers without using a bonding agent or a bonding film.

Further, the laminates may be joined at a temperature of 80° C. to 140° C., 80° C. to 130° C., or 100° C. to 120° C. By adjusting the temperature of joining the laminates within the above-described temperature range, an interfacial bonding strength between the two polyurethane resin layers may be effectively improved. In addition, by joining the two laminates under the above-described temperature condition, it is possible to suppress that the polyurethane resin layer is excessively melted to flow out of the substrate film, so that the thickness of the thermoplastic polyurethane film is reduced.

According to an exemplary embodiment of the present invention, the two polyurethane resin layers may directly adhere to each other by joining two laminates by a method used in the art. For example, the two polyurethane resin layers may adhere to each other by joining the two laminates while allowing the two laminates to pass through between two press rolls heated at 80° C. to 140° C.

According to an exemplary embodiment of the present invention, the joined laminates may be aged at a temperature of 20° C. to 60° C. for 12 to 24 hours. Specifically, the joined laminates may be aged at a temperature of 25° C. to 55° C., 20° C. to 35° C., or 40° C. to 50° C.

An interfacial bonding strength between two polyurethane resin layers may be more effectively improved by aging the two polyurethane resin layers under the above-described temperature and time conditions. In a process in which the laminate including the two adhered polyurethane resin layers is aged, polyurethane resins present on a surface where the two polyurethane resin layers are brought into contact with each other may be additionally cured and bonded to each other. Accordingly, a bonding strength between the two polyurethane resin layers may be more improved.

Furthermore, since the polyurethane resin layer included in the laminate is semi-cured, a finally cured thermoplastic polyurethane film may be prepared by aging two adhered polyurethane resin layers. In a process in which the joined laminates are aged, the polyurethane resin included in the polyurethane resin layer may react with the first isocyanate-based curing agent, so that the weight average molecular weight of the polyurethane resin may be increased. Further, additional reactions may proceed among small amounts of the polyol, the chain extender, and the second isocyanate-based curing agent, which remain in the semi-cured polyurethane resin layer.

According to an exemplary embodiment of the present invention, the method may further include, after the aging of the joined laminates, removing the substrate films.

According to an exemplary embodiment of the present invention, the thermoplastic polyurethane film except for the substrate may have a thickness of 20 μm to 500 μm. Specifically, the thermoplastic polyurethane film may have a thickness of 40 μm to 450 μm, 100 μm to 300 μm, or 200 μm to 450 μm. That is, the method for preparing a thermoplastic polyurethane film may provide a thermoplastic polyurethane film having a large thickness, as compared to an existing polyurethane film.

Another exemplary embodiment of the present invention provides a thermoplastic polyurethane film including two polyurethane resin layers directly brought into contact with each other, in which an interfacial bonding strength between the two polyurethane resin layers is 14 Mpa to 18 Mpa, and the polyurethane resin layer includes a cured product of a polyurethane resin composition including a polyurethane resin, a first isocyanate-based curing agent, and an organic solvent.

The thermoplastic polyurethane film according to an exemplary embodiment of the present invention may be prepared by the above-described method for preparing a thermoplastic polyurethane film.

The thermoplastic polyurethane film according to an exemplary embodiment of the present invention may have a large thickness and excellent durability. Specifically, the thermoplastic polyurethane film includes two polyurethane resin layers which are provided to be directly brought into contact with each other, and thus may have a large thickness, as compared to an existing polyurethane film.

In addition, an interfacial bonding strength between the two polyurethane resin layers may be 14 Mpa to 18 Mpa, 15 Mpa to 17 Mpa, 14 Mpa to 16 Mpa, or 16.5 Mpa to 18 Mpa. The thermoplastic polyurethane film including the two polyurethane resin layers satisfying an interfacial bonding strength within the above-described range may have excellent durability and service life characteristics.

According to an exemplary embodiment of the present invention, a content of the first isocyanate-based curing agent may be more than 5 parts by weight and less than 7.5 parts by weight or 5.5 parts by weight to 7.25 parts by weight, based on 100 parts by weight of the polyurethane resin. By adjusting the content of the first isocyanate-based curing agent within the above-described range, it is possible to provide a thermoplastic polyurethane film including two polyurethane resin layers having an excellent interfacial bonding strength.

According to an exemplary embodiment of the present invention, the polyurethane resin may be a copolymer of a mixture including: a polyol having a number average molecular weight of 1,800 g/mol to 2,200 g/mol; a chain extender including a diol having 4 to 10 carbon atoms; and a second isocyanate-based curing agent.

According to an exemplary embodiment of the present invention, the polyurethane resin may have a weight average molecular weight of 40,000 g/mol to 70,000 g/mol. By adjusting the weight average molecular weight of the polyurethane resin, physical properties of the thermoplastic polyurethane film such as tensile strength and durability may be easily controlled.

The polyol, the chain extender, the first isocyanate-based curing agent, the second isocyanate-based curing agent, the organic solvent, the catalyst, and the like in the thermoplastic polyurethane film may be the same as the polyol, the chain extender, the first isocyanate-based curing agent, the second isocyanate-based curing agent, the organic solvent, the catalyst, and the like which are used in the above-described method for preparing a thermoplastic polyurethane film.

According to an exemplary embodiment of the present invention, a content of the polyol may be 45 wt % to 55 wt %, specifically, 48 wt % to 54 wt %, or 50 wt % to 53 wt %, based on the weight of the mixture. By adjusting the content of the polyol in the mixture within the above-described range, the processability of the thermoplastic polyurethane film may be improved.

According to an exemplary embodiment of the present invention, a content of the chain extender may be 10 wt % to 15 wt % based on the weight of the mixture. Specifically, the content of the chain extender may be 10.5 wt % to 14 wt % or 12 wt % to 12.5 wt %, based on the weight of the mixture. By adjusting the content of the chain extender in the mixture within the above-described range, the chain extender may react with the second isocyanate-based curing agent to effectively form the hard segment of the polyurethane resin, and may improve mechanical properties of a prepared thermoplastic polyurethane film.

According to an exemplary embodiment of the present invention, a content of the second isocyanate-based curing agent may be 32.5 wt % to 40 wt %, specifically, 34 wt % to 38 wt %, or 35 wt % to 36.5 wt %, based on the weight of the mixture. By adjusting the content of the second isocyanate-based curing agent within the above-described range, a polyurethane resin may be effectively polymerized, and processability and durability of a prepared thermoplastic polyurethane film may be improved.

According to an exemplary embodiment of the present invention, the mixture may further include a catalyst, and a content of the catalyst may be 0.005 part by weight to 0.02 part by weight or 0.008 part by weight to 0.015 part by weight, based on 100 parts by weight of the mixture. By adjusting the content of the catalyst within the above-described range, a polymerization reaction of the polyurethane resin may be effectively promoted, and the polyurethane resin may be polymerized at a relatively low temperature.

According to an exemplary embodiment of the present invention, a content of the organic solvent may be 30 parts by weight to 80 parts by weight based on 100 parts by weight of the polyurethane resin. By adjusting the content of the organic solvent within the above-described range, a content of a solid content of the polyurethane resin composition may be controlled, and coatability of the polyurethane resin composition may be improved.

According to an exemplary embodiment of the present invention, the content of the solid content of the polyurethane resin composition may be 20% to 70%. Specifically, the content of the solid content of the polyurethane resin composition may be 30% to 60%, or 40% to 55%. When the content of the solid content of the polyurethane resin composition is within the above-described range, the polyurethane resin composition may be applied thickly onto a substrate film, and a polyurethane resin layer having a large thickness may be formed on the substrate film.

According to an exemplary embodiment of the present invention, the thermoplastic polyurethane film may have a thickness of 20 μm to 500 μm. Specifically, a thermoplastic polyurethane film consisting of the two polyurethane resin layers may have a thickness of 40 μm to 450 μm, 100 μm to 300 μm, or 200 μm to 450 μm. That is, the thermoplastic polyurethane film may have a large thickness, as compared to an existing polyurethane film.

EXPLANATION OF REFERENCE NUMERALS AND SYMBOLS

100: Laminate
10, 10': Substrate film
20, 20': Polyurethane resin layer
200: Thermoplastic polyurethane film
300: Experimental apparatus for measuring interfacial bonding strength

MODE FOR INVENTION

Hereinafter, the present invention will be described in detail with reference to Examples for specifically describing the present invention. However, the Examples according to the present invention may be modified in various forms, and it is not interpreted that the scope of the present invention is limited to the Examples to be described below. The Examples of the present specification are provided for more completely explaining the present invention to the person with ordinary skill in the art.

EXAMPLE 1

Preparation of Polyurethane Resin Composition

Polycarbonatediol (PCDL, Asahi Kasei Chemicals Corporation) having a number average molecular weight of 2,050 g/mol as a polyol, 1,4-butanediol (1,4BD, manufactured by BASF SE) as a chain extender, H12MDI (manufactured by Evonik Industries) including two isocyanate functional groups as a first isocyanate-based curing agent, isophorone diisocyanate (IPDI, manufactured by Evonik Industries) as a second isocyanate-based curing agent, dibutyltin dilaurate (DBTDL) as a catalyst, and methyl ethyl ketone as an organic solvent were prepared. Thereafter, a mixture in which a content of the polyol was about 52.6 wt %, a content of the chain extender was about 12.3 wt %, and a content of the second isocyanate-based curing agent was about 35.1 wt % was prepared, and a mixed solution was prepared by mixing 100 parts by weight of the mixture and about 50 parts by weight of the organic solvent.

The prepared mixed solution was charged into a reactor and warmed to 55° C., and 0.005 part by weight of the catalyst was added to 100 parts by weight of the mixture while maintaining the temperature. A composition including a polyurethane resin having a weight average molecular weight of about 51,000 g/mol was prepared by allowing the resulting mixture to react at 57° C. for 25 hours. Thereafter, by adding about 7 parts by weight of the first isocyanate-based curing agent based on 100 parts by weight of the prepared polyurethane resin to the composition, a polyurethane resin composition was prepared. A content of a solid content of the prepared polyurethane resin composition was about 45%.

Preparation of Thermoplastic Polyurethane Film

The prepared polyurethane resin composition was applied to a thickness of about 200 μm onto a polyethylene terephthalate (PET) film which is a substrate film. Thereafter, by heat-treating the polyurethane resin composition at 100° C., a laminate in which a polyurethane resin layer having a thickness of 95 μm is formed on the substrate film was prepared. One more laminate was prepared by the same method, and the laminates were disposed such that the respective polyurethane resin layers of the two laminates face each other. Thereafter, the two polyurethane resin layers adhere to each other by allowing the two laminates to pass through between a pair of press rolls heated to 100° C. to join the laminates. Thereafter, the joined laminates were aged at a temperature of 25° C. for hours, and then the PET films were removed from the laminates, thereby preparing a thermoplastic polyurethane film having a thickness of about 190 μm.

EXAMPLES 2 TO 5

A thermoplastic polyurethane film was prepared in the same manner as in Example 1, except that the temperature for joining the laminates and the temperature for aging the joined laminates were adjusted as in the following Table 1.

COMPARATIVE EXAMPLES 1 TO 5

A thermoplastic polyurethane film was prepared in the same manner as in Example 1, except that the temperature for joining the laminates and the temperature for aging the joined laminates were adjusted as in the following Table 1.

Experiment of Measuring Interfacial Bonding Strength between Polyurethane Resin Layers A sample of the thermoplastic polyurethane film according to Example 1 was prepared in the same manner as in Example 1, except that two laminates each having a size of 15 cm breadth and 2.5 cm length were prepared, only portions of the two laminates, with breadth 7.5 cm and length 2.5 cm, were joined, and the other portions were not joined. Further, samples according to Examples 2 to 5 and Comparative Examples 1 to 5 were each prepared in the same manner as in the above-described method.

The interfacial bonding strengths between the polyurethane resin layers of the samples according to Examples 1 to 5 and Comparative Examples 1 to 5 were measured by using an ultimate tensile machine (UTM, Model 3343, manufactured by INSTRON Inc.).

FIG. 2 is a view schematically illustrating an experiment of measuring an interfacial bonding strength between the polyurethane resin layers according to an exemplary embodiment of the present invention.

As seen in FIG. 2, while end portions of the two polyurethane resin layers 20 and 20', which did not adhere to each other in the sample according to Example 1, were fixed to the UTM 30, and the end portions were pulled, a tensile strength applied on the sample was measured at the time point when the two polyurethane resin layers were peeled off from each other. The interfacial bonding strengths between the polyurethane resin layers of the samples according to Examples 2 to 5 and Comparative Examples 1 to 5 were measured in the same manner as in the above-described method, and the results are shown in the following Table 1.

TABLE 1

|  | Temperature for aging (° C.) | Temperature for joining (° C.) | Interfacial bonding strength (Mpa) |
|---|---|---|---|
| Example 1 | 25 | 100 | 14.1 |
| Example 2 | 25 | 120 | 15.8 |
| Example 3 | 50 | 80 | 15.6 |
| Example 4 | 50 | 100 | 15.9 |
| Example 5 | 50 | 120 | 16.5 |
| Comparative Example 1 | −20 | 60 | 5.2 |
| Comparative Example 2 | −20 | 80 | 9.2 |
| Comparative Example 3 | −20 | 100 | 10.1 |
| Comparative Example 4 | −20 | 120 | 12.5 |
| Comparative Example 5 | 25 | 60 | 11.1 |

Referring to Table 1, it was confirmed that the interfacial bonding strength between the two polyurethane resin layers was 14 Mpa to 18 Mpa in Examples 1 to 5 in which the laminates were joined at a temperature of 80° C. to 140° C., and the joined laminates were aged at a temperature of 20° C. to 60° C.

In contrast, it was confirmed that the interfacial bonding strength between the two polyurethane resin layers was inferior in Comparative Examples 1 and 5 in which the laminates were joined at a temperature of 60° C. In addition, it was confirmed that in Comparative Examples 2 to 4 in which the joined laminates were aged at a temperature of −20° C., the interfacial bonding strength between the two polyurethane resin layers was inferior even in the case where the temperature of joining the laminates was adjusted to 80° C. to 140° C.

Accordingly, it can be seen that the method for preparing a thermoplastic polyurethane film according to an exemplary embodiment of the present invention can easily prepare a thermoplastic polyurethane film having excellent service life characteristics and durability and a large thickness by including two polyurethane resin layers having an excellent interfacial bonding strength.

The invention claimed is:

1. A method for preparing a thermoplastic polyurethane film, the method comprising:
preparing a polyurethane resin composition comprising a polyurethane resin, a first isocyanate-based curing agent, and an organic solvent;
preparing two laminates, each comprising a polyurethane resin layer by applying the polyurethane resin composition onto a substrate film and heat-treating the polyurethane resin composition;
joining the two laminates so that respective polyurethane resin layers of the two laminates face each other to form joined laminates at a temperature of 80° C. to 140° C.; and
forming a thermoplastic polyurethane film comprising two polyurethane resin layers directly brought into contact with each other by aging the joined laminates at a temperature of 20° C. to 60° C. for 12 to 24 hours,
wherein an interfacial bonding strength between the two polyurethane resin layers is 14 Mpa to 18 Mpa,
wherein the polyurethane resin is prepared by carrying out a copolymerization reaction of a mixture, which comprises a polyol having a number average molecular weight of 1,800 g/mol to 2,200 g/mol; a chain extender comprising a diol having 4 to 10 carbon atoms; and a second isocyanate-based curing agent, and wherein a content of the polyol is 45 wt % to 55 wt % based on a total weight of the mixture.

2. The method of claim 1, wherein the heat treating is carried out at a temperature of 100° C. to 150° C.

3. The method of claim 1, wherein a content of the first isocyanate-based curing agent is more than 5 parts by weight and less than 7.5 parts by weight based on 100 parts by weight of the polyurethane resin.

4. The method of claim 1, wherein the first isocyanate-based curing agent comprises two to six isocyanate functional groups.

5. The method of claim 1, wherein the copolymerization reaction is carried out at a temperature of 50° C. to 70° C.

6. The method of claim 1, wherein a content of the chain extender is 10 wt % to 15 wt % based on a total weight of the mixture.

7. The method of claim 1, wherein a content of the second isocyanate-based curing agent is 32.5 wt % to 40 wt % based on a total weight of the mixture.

8. The method of claim 1, wherein a content of a solid content of the polyurethane resin composition is 20% to 70%.

9. The method of claim 1, wherein the thermoplastic polyurethane film has a thickness of 20 μm to 500 μm.

* * * * *